Aug. 31, 1965  H. WOLLMANN ETAL  3,204,224
CIRCUIT ARRANGEMENT AND A METHOD OF ADJUSTING THE
PERMANENT FLUX IN A MAGNETIZABLE ELEMENT
Filed Nov. 18, 1960  2 Sheets-Sheet 1

INVENTOR
H.Wollmann-Th.Grewe
-O.Kolb

BY

United States Patent Office 3,204,224
Patented Aug. 31, 1965

3,204,224
CIRCUIT ARRANGEMENT AND A METHOD OF ADJUSTING THE PERMANENT FLUX IN A MAGNETIZABLE ELEMENT
Heinz Wollmann, Stuttgart-Zuffenhausen, Theodor Grewe, Eckernforde, and Otmar Kolb, Stuttgart-Weilimdorf, Germany, assignors to International Standard Electric Corporation, New York, N.Y., a corporation of Delaware
Filed Nov. 18, 1960, Ser. No. 70,272
Claims priority, application Germany, Dec. 2, 1959, St 15,862
5 Claims. (Cl. 340—174)

The invention relates to a circuit arrangement and a method of adjusting the permanent flux in a magnetizable element and more particularly to a circuit and method for adjusting the flux in a magnetizable element in a large number of equal permanent flux variations.

Magnetizable elements are sometimes used in the communications art to provide an adjustable impedance, whose value can be adjusted in a step-by-step manner by varying the permanent magnetization of the element.

A pulse-counting device is known in which the permanent magnetization of a reactive coil is carried out in a step-by-step manner. This is accomplished by utilizing voltage impulses of the same amplitude rather than a direct voltage to cause the magnetization. If the winding of such a reactive coil is acted upon by individual impulses of such magnitude that the time integral of the individual impulse is a fraction of the time integral of a "total"-impulse which would drive the reactive coil to the saturation point, then the magnetization is carried out in individual steps. In this method only a relatively small number of steps are possible before reaching the saturation point.

Furthermore, a method of adjusting the permanent flux in a magnetic element is already known in which one or more impulses of such a high amplitude are applied to a winding that one individual impulse produces a magnetomotive force which is higher than the static coercitive force of the respective magnetic element, and of such a short duration, that the length of one individual pulse is insufficient for effecting a magnetization of the magnetic element from the one state of remanence into the other one.

However, this method only permits a relatively small number of steps, and has the further disadvantage that a certain time interval has to elapse between the individual interrogation impulses in order to avoid a partial or complete irreversible change of magnetization.

It is the object of the present invention to avoid the above mentioned disadvantages and to provide a method of adjusting or setting-up the permanent flux in a magnetizable element by applying impulses to an adjusting winding.

According to the invention this is accomplished by providing, at the time position of the changeover of the reversible flux variation to the irreversible flux variation, a signal which is utilized for marking the actual beginning of the adjustment of the permanent flux.

A particularly advantageous embodiment of the invention consists in that the adjustment is carried out by a flux imprintment, and in that the adjusting current is differentiated, so that at the time position of the changeover of the reversible flux variation to the irreversible flux variation, at which the otherwise practically linear curve of current rise has a bend, an impulse is generated which delays the adjusting impulse for a period of time thereafter.

The above-mentioned and other features and objects of this invention and the manner of attaining them will become more apparent and the invention itself will be best understood by reference to the following description of an embodiment of the invention taken in conjunction with the accompanying drawings, in which.

and $$\frac{d^2 i}{dt^2}$$

respectively; and

Figure 3:
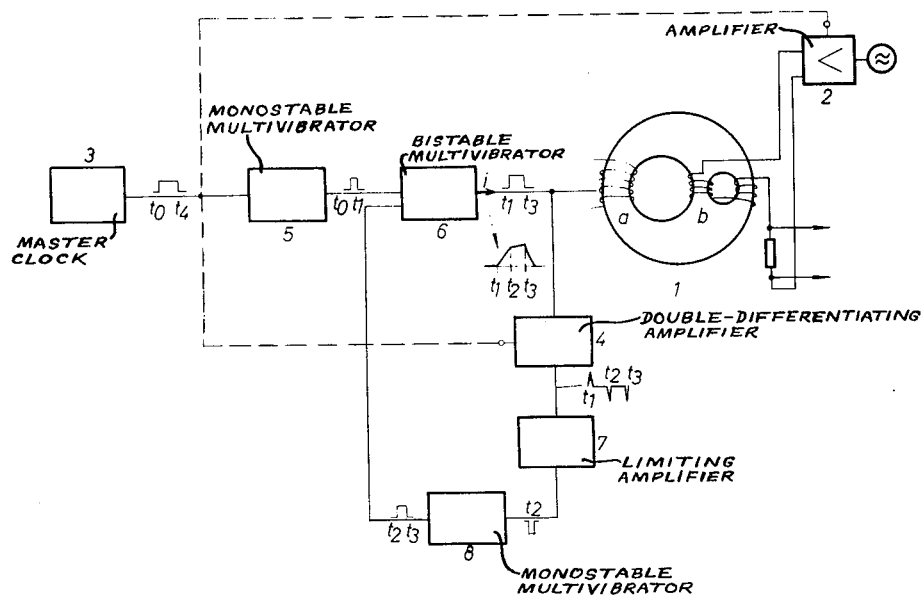

FIG. 3 shows the block diagram of the inventive arrangement for adjusting the magnetic element.

The principle of the invention will now be described with reference to FIGS. 1 and 2.

Figure 1:
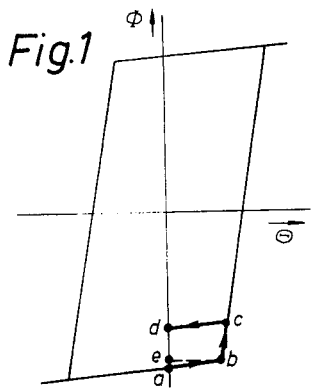
FIG. 1 shows a quasistatic hysteresis loop $\phi = f(\theta)$ of a single stage magnetizable element.
Figure 2:
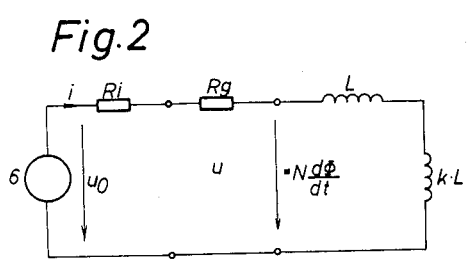
FIG. 2 shows the equivalent circuit diagram of the adjusting or setting up circuit used with the magnetic element to be controlled.
Figure 2A:
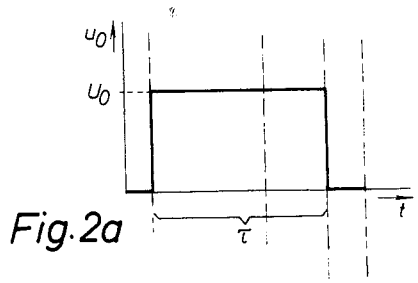
FIGS. 2a through 2e show the curves in relation to time of $u_0$, $\phi i$ or $\theta$, $$\frac{di}{dt}$$

In FIG. 1 the section $\overline{ab}$ represents the reversible adjustment of the magnetic field of the coil, and the section $\overline{ae}$ represents the flux variation $\Delta\phi_{\text{rev}}$ which is caused thereby. The section $\overline{bc}$ corresponds to the irreversible magnetization processes. The section $\overline{cd}$ represents the collapse of the magnetic field of the coil which has been set up from $a$ to $c$, or respectively the reduction of the reversible process. The section $\overline{ad}$ corresponds to the remaining irreversible flux variation $\Delta\phi_{\text{irrev}}$.

In the equivalent circuit diagram of the adjusting circuit (FIG. 2) $u_0$ indicates the original voltage and $R_i$ is the internal resistance of the source of adjusting current 6. The adjusting current is indicated by $i$, $R_g$ indicates the direct-current resistance, L the reversible inductance, and N the number of turns of the adjusting winding. The complex equivalent inductance for the irreversible processes is indicated by the references $k \cdot L$.

When the source of voltage $u_0$ is operative, the flow of current $i$ and the circuation $\theta$ takes place in accordance with the function $$i = K_1\left(1 - e^{-\frac{t}{T}}\right) \text{ and } \theta = K_2\left(1 - e^{-\frac{t}{T}}\right)$$

until the edge of the hysteresis loop is reached (FIG. 1, section $\overline{ab}$). During this time the flux $\phi$ varies by the amount $\Delta\phi_{\text{rev}}$ (FIG. 1, section $\overline{ae}$). The current $i$ or respectively the circulation $\theta$ increases substantially slower from point $b$ to $c$ and causes a further flux variation $\Delta\phi_{\text{irrev}}$, until $u_0$ is switched off at point $c$. Thereupon $i$ or $\theta$ decreases in accordance with the function $$i + K_3 e^{-\frac{t}{T}} \text{ and } \theta = K_4 e^{-\frac{t}{T}}$$

as shown by section $\overline{cd}$ of FIG. 1 during which time the flux variation $\Delta\phi_{\text{rev}}$ disappears. Thereafter $\Delta\phi_{\text{irrev}}$ (FIG. 1, section $\overline{ad}$) remains as permanent flux.

Figure 2B:
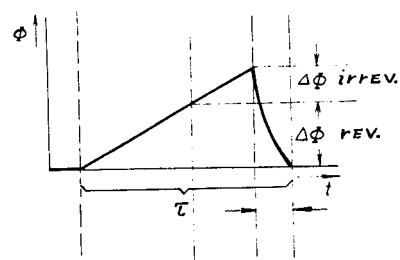
Figure 2C:
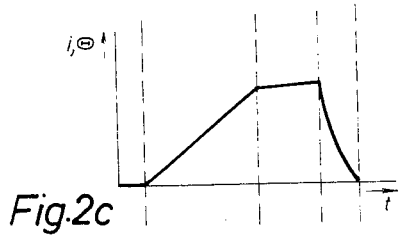
Figure 2D:
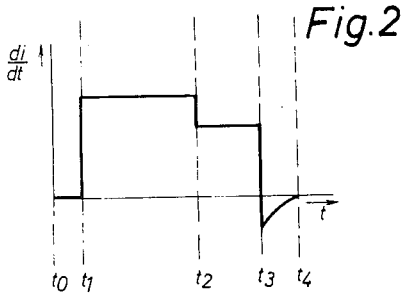

If the total switch-on time of $u_0$, shown as the pulse duration $\tau$, is small with respect to the time constant $$T = \frac{L}{R_i + R_g}$$

then $i$ or $\theta$ of FIG. 2c practically increases linearly in the reversible as well as in the irreversible section, and accordingly $u_{\text{coil}} \approx i(R_i + R_g)$. During the period of time in which the reversible magnetization takes place (FIG. 2b, $t_1$ to $t_2$) $i$ or $\theta$ increases steeply (FIG. 2c, $i$, $\theta = f(t)$). Meanwhile $$u_{\text{coil}} = L\frac{di}{dt}$$

and almost the entire energy serves the setting-up of the magnetic field. A small portion of the energy is converted into heat by the resistors $R_i$ and $R_g$. From a certain time position onwards from $t_2$ to $t_3$ (FIG. 2c) the current $i$ or the circulation $\theta$ increases with a substantially flatter curve. During this time the majority of the pulse energy in the core causes irreversible magnetization steps and/or reversible processes. During this time a small portion of the energy serves the further setting-up of the field, and another small portion is converted into heat in the resistors $R_i$ and $R_g$. Accordingly it is called an imprinted flux variation if $\tau \ll T$ and, consequently, if $u_{coil} \approx u_0$. Accordingly:

$$\Delta\phi = (\Delta\phi_{rev} + \Delta\phi_{irrev}) = \frac{1}{N}\int_0^\tau u_{coil} \cdot dt \approx \frac{u_0 \cdot \tau}{N}$$

If, instead of a rectangular impulse, any other suitable pulse shape is applied then $$\Delta\phi \approx \frac{1}{N}\int_0^\tau u_0 \cdot dt$$

wherein $\tau$ is the width of the impulse base.

The adjustment of the magnetic element with the aid of an imprinted flux variation $\Delta\phi$ has been chosen on account of the following advantages derived from this kind of adjustment:

(a) Both the amplitude and the duration of the adjusting impulse are independent of the respective value of the impedance ($\mathcal{R}_{st}$) of the magnetic element.

(b) There is imprinted that particular physical quantity ($\phi \sim \int u_0 \cdot dt$) whose permanent variation are utilized. For this reason it is possible to cope with unambiguous adjusting characteristics $\mathcal{R}_{st} = f$ (number of storage steps).

(c) The storage efficiency is a good one since the majority of the pulse energy serves the actual storage purpose.

When carrying out the adjustment of the permanent flux with equal adjusting impulses then a relatively small number of storage steps is obtained as a result of the physical properties of the core.

Figure 2E:
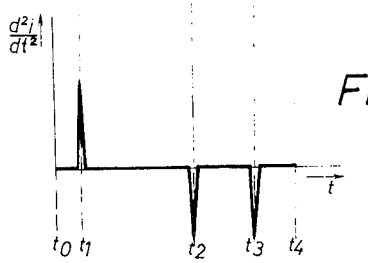

According to the invention a large number of equal storage steps is achieved in that the curve in relation to time, $i$ or $\theta$ respectively is differentiated, so that at the time position where the bend appears in the current rise (FIG. 2c; $i$, $\theta = f(t)$) which bend appears at a somewhat later time position $t_2$ in each additional storage step, an impulse is generated (FIG. 2e) which is only utilized for marking the actual beginning of the storage process.

When designating this impulse time position by $t_2$ and the end of the impulse by $t_3$ (FIGS. 2a to 2e), then the desired storage stage is $$\Delta\phi_{irrev} = \frac{1}{N}\int_{t_2}^{t_3} u_0 \cdot dt = \frac{u_0(t_3 - t_2)}{N}$$

FIG. 3 shows the block diagram of the circuit arrangement for carrying out the inventive method. Reference numeral 1 indicates the magnetizable element which consists of a core with one large and one small hole, and which is provided with the adjusting winding $a$ and with the $\mathcal{R}_{st}$-winding $b$. The last mentioned winding is acted upon by the voltage to be regulated from amplifier 2 which is capable of being suppressed.

The adjustment of a storage stage is now effected as follows:

The master clock 3, an astable multivibrator, produces a rectangular impulse which commences at the time position $t = t_0$ and terminates at the time position $t = t_4$. This impulse blocks the amplifier 2 during the adjusting process, so that no voltage is induced from the $\mathcal{R}_{st}$-winding to the adjusting winding $a$. In order to achieve a further improvement, the $\mathcal{R}_{st}$-winding is wound in such a way that it is decoupled from the adjusting winding as much as possible. In addition thereto this rectangular impulse unblocks the double-differentiating amplifier 4, whose input is connected in series with the adjusting winding $a$. The leading edge of the clock pulse starts a monostable multivibrator 5 which delays the beginning of the adjusting process until both the dying-out process of the amplifier 2 and the building-up process of the double-differentiating amplifier 4 are terminated. This multivibrator 5 delivers a rectangular delay impulse which is terminated at the time position $t = t_1$, and whose trailing edge triggers a pulse generator or bistable multivibrator 6, into the operating position to switch on a direct voltage $U_0$ which causes a current $i$ to flow through the adjusting winding $a$ and through the input of the double-differentiating amplifier 4.

Since the duration of the current flow in the adjusting winding $\Delta(t_3 - t_1)$ is chosen small in relation to the reversible time-constant $$T = \frac{L}{R_i + R_g}$$

the adjusting current $i$ or the circulation $\theta$ is practically increased in a linear fashion, so that $$i \approx \frac{u_0}{L} \cdot t$$

At the time position $t_2$ the circulation $\theta = i \cdot N$ reaches a value at which the irreversible processes in the core are started, and the rise of $\theta$ or $i$ suddenly becomes flatter (FIG. 2c; $i$, $\theta = f(t)$). This bend in the current characteristic which marks the beginning of the storage process, after two differentiations effected by the double-differentiating amplifier 4 at the time position $t_2$, delivers a needle impulse, FIG. 2e;

$$\frac{d^2 i}{dt^2} = f(t)$$

which is again amplified in the limiting amplifier 7, and is then shaped and freed from noises. This needle impulse triggers monostable multivibrator 8 which produces a rectangular impulse whose trailing edge switches the pulse source or generator 6 back to normal disconnecting the output direct voltage $U_0$ at the time position $t_3$. In this way the storage process is terminated. The permanent flux in the magnetic core has thus been varied by the amount $\Delta\theta_{irrev} = u_0(t_3 - t_2)/N$. Accordingly, the duration of the impulse $\tau = t_3 - t_2$ of the monostable multivibrator 8 alone determines the irreversible flux variation in the magnetic core and is adjusted in such a way that the desired magnitude of the storage stage will result.

At the time position $t_4$ the amplifier 2 is switched on again, and the double-differentiating amplifier 4 is suppressed.

The adjustment of the magnetic core for the next step now takes place.

While we have described above the principles of the invention in connection with specific apparatus, it is to be clearly understood that this description is made only by way of example and not as a limitation to the scope of the invention as set forth in the objects thereof and in the accompanying claims.

What is claimed is:

1. In a circuit arrangement for providing a series of successive permanent flux storage steps in a magnetic element having rectangular hysteresis loop characteristics, an adjusting winding on said element, means for generating a series of timed impulses, gate means for passing each of said impulses to said adjusting winding to change the state of magnetization of said element, means for detecting the change in said element from a reversible magnetization to an irreversible magnetization, and control means operable responsive to said detection for controlling said gate means to terminate each said impulse a predetermined time after said detection, said control means includes means for generating a start pulse in response to said change detection and for generating a stop pulse a predetermined time interval thereafter, and wherein said stop pulse operates said gate means to terminate each said impulse.

2. A circuit arrangement as set forth in claim 1 wherein the slope of the current rise through said adjusting winding varies between the reversible and irreversible magnetization states of said element and wherein the said means for generating a stop pulse includes means for twice differentiating the said current with respect to time at the said current slope variation.

3. A magnetic counting device comprising a rectangular hysteresis loop core member having at least an adjusting winding thereon, means responsive to successive input pulses for energizing said adjusting winding to store successive incremental flux changes in said core member, each of said flux changes comprising a reversible change followed by an irreversible change, means for detecting the instant during said flux change when said reversible change terminates and said irreversible change begins, means responsive to said detection of said instant for triggering the generation of a pulse of a uniformly standard volt-second content, and means for applying said generated pulse to said adjusting winding for driving said core flux through said reversible change.

4. The device of claim 3 wherein the current in said adjusting winding rises almost linearly with a steep rate of change during said reversible change and at a substantially flatter rate of change during said irreversible change, means comprising a double differentiating amplifier for producing a spike pulse responsive to the change in said current from said steep to said flattened rate of change.

5. The device of claim 4 and means responsive to said spike pulse for causing the triggering of said standard pulse.

References Cited by the Examiner
UNITED STATES PATENTS

| | | | |
|---|---|---|---|
| 2,808,578 | 10/57 | Goodell et al. | 340—174 |
| 2,882,426 | 4/59 | Hu | 307—88 |
| 2,958,787 | 11/60 | Hardenbergh | 340—174 X |
| 2,990,540 | 6/61 | Sublette et al. | 340—174 |

IRVING L. SRAGOW, *Primary Examiner.*

STEPHEN W. CAPELLI, *Examiner.*